United States Patent [19]
Norris

[11] Patent Number: 5,363,444
[45] Date of Patent: Nov. 8, 1994

[54] UNIDIRECTIONAL EAR MICROPHONE AND METHOD

[75] Inventor: Elwood G. Norris, Poway Calif.

[73] Assignee: Jabra Corporation, San Diego, Calif.

[21] Appl. No.: 183,625

[22] Filed: Jan. 18, 1994

Related U.S. Application Data

[63] Continuation of Ser. No. 881,141, May 11, 1992, abandoned.

[51] Int. Cl.⁵ .................. H04M 1/00; H04R 25/00
[52] U.S. Cl. ..................... 379/430; 381/68.6
[58] Field of Search ............. 379/430, 433; 381/68.1, 381/68.3, 68.6, 151, 159, 183, 187, 169, 186, 191, 155

[56] References Cited

U.S. PATENT DOCUMENTS

| | | | |
|---|---|---|---|
| 2,363,175 | 11/1944 | Grassman | 381/68.6 |
| 3,197,576 | 7/1965 | Martin | 381/169 |
| 3,922,488 | 11/1975 | Gabr | 381/94 |
| 3,995,124 | 11/1976 | Gabr | 381/158 |
| 4,009,355 | 2/1977 | Paradowski | 381/191 |
| 4,051,330 | 9/1977 | Cole | 381/68.1 |
| 4,367,374 | 1/1983 | Serrano | 379/93 |
| 4,463,222 | 7/1984 | Poradowski | 381/155 |
| 4,588,867 | 5/1986 | Konomi | . |
| 4,860,342 | 8/1989 | Danner | 379/454 |
| 4,864,610 | 9/1989 | Stevens | 379/430 |
| 4,930,156 | 5/1990 | Norris | . |
| 5,109,410 | 4/1992 | Suhami et al. | 381/151 |

FOREIGN PATENT DOCUMENTS

0263667 4/1988 European Pat. Off. ........... 381/68.1

Primary Examiner—James L. Dwyer
Assistant Examiner—Jack Chiang
Attorney, Agent, or Firm—Thorpe, North & Western

[57] ABSTRACT

An ear piece device configured for being supported in the ear and providing a microphone which primarily detects only sounds originated by the user is contained within a housing which is configured at one end to fit snugly at the ear canal of the user, but not to extend within the ear canal. A microphone element is coupled within the housing in a position such that the microphone element is separated from contact with the skull of the user by the housing. This microphone element is contained within a casement which is mechanically and acoustically isolated from vibrations occurring within the housing. Mounting rings formed of acoustical absorbing materials are interposed around the casement and between the housing and casement in a displaced configuration on opposing ends of the casement to result in cancellation of residual vibrations passing to the microphone element from the housing. A speaker element may be included within the ear device and can be decoupled acoustically so as to avoid feedback. This system can operate with full duplex and enable hands free communication and direct voice command by user through computer modems, telephone networks and other communication systems.

24 Claims, 4 Drawing Sheets

UNIDIRECTIONAL EAR MICROPHONE AND METHOD

This application is a continuation of U.S. application Ser. No. 07/881,141, filed May 11, 1992 of Elwood G. Norris for Unidirectional Ear Microphone and Method, now abandoned.

BACKGROUND OF THE INVENTION

1. Field of the Invention

This invention pertains to a microphone/speaker combination which picks up speech vibrations on a unidirectional basis and develops an isolated signal for audio processing which deletes background audio signal. More particularly, the present invention relates to an ear mounted microphone/speaker combination responsive to speech from the user which is substantially isolated from surrounding background noise and which can be used in duplex without occurrence of feedback.

2. Prior Art

The emergence of computer based control systems for virtually every aspect of daily living has re-emphasized the need for an inexpensive system for providing direct voice command capability. At present, most computer systems rely on keyboard input to provide data and processing instructions. This is not only time consuming and limiting in view of physical requirements of being seated with both hands on a key pad, but it limits the efficiency of data input to the typing speed of the user. Indeed, compared with the advanced degree of sophistication of current computer systems, this dominant data entry method of imputing instructions one letter or number at a time seems almost archaic.

This is not to say that the development of voice activated input systems has been ignored. There has clearly been a long recognized need for implementation of a method of voice command which would obviate the keyboard as a computer input device. Numerous problems have remained unsolved, however, and continue to place voice activated systems beyond the financial reach of the general marketplace. For example, the typical level of confidence in voice recognition for commercial software is between 45 to 60%. At this rate, the system is averaging only one out of two words with correct identification. This is hardly adequate for general application. This confidence level is even less when environmental factors are introduced such as background noise, mobility of the user and other unpredictable variables that modify the audio signal being received at the computer.

In typical applications for voice activated systems, one might expect a telephone to ring during dictation, an interruption to occur by another voice having a different voice pattern, the sounding of a horn, clock alarm, or any of thousands of extraneous background noises. Even the shifting of position of the speaking individual can modify the audio signal enough to confuse the computer recognition of sounds. The speaker may simply turn her head to a different direction and create enough variation to thwart voice recognition.

Resolution of these anomalies must be accomplished before voice command systems can be of general use. Current efforts have focused on generation of complex algorithms which sift through the maze of audio signal and attempt to classify and discard background noise. Obviously, it is impossible to completely predict and program every potential superfluous signal that may eventually be detected. Voice variations by the user are even more challenging, because the occurrence of a cold, sinus problems, and variations in voice orientation to the microphone are extremely difficult to classify or quantify. As a consequence, voice command systems are marginal in overall performance and are extremely expensive.

Undoubtedly, part of the problem of voice recognition arises because of the use of conventional microphones as the media for processing voice signals. Voice recognition obviously requires conversion of the audio input to digital or analog signal. Generally, a digital conversion is necessary before comparison with database information is possible. A normal microphone will pick up sounds indiscriminately, thereby adding in background noise which is a primary source of confusion.

Although some discrimination of sound can be accomplished by frequency filters, proximity attenuators, and related devices that group sound characteristics as to common features of frequency or volume, total isolation of desired sounds has not generally been accomplished when the speaker is in a nonisolated environment. Although some applications of unidirectional microphones have provided improved isolation, development of such a totally selective microphone system has long been needed and would provide great advantage in countless applications. This is so with any form of telephone system that is hands free so that the microphone is picking up background signal along with the primary speaker's voice. Visor microphones for cellular car phones are just one of a myriad of examples. TV and stage cameramen, as well as other sound technicians who must communicate quietly while recording or producing video and sound works, require constant communication which functions best in an isolated mode. Switchboard operators, pilots, motorcyclists, workers having on-line communication systems in high-noise environments—all need a communication system which isolates the voice signal from all extraneous sounds.

U.S. Pat. No. 4,588,867 by Konomi addressed some of these problems and disclosed the possible utility of an ear-mounted microphone for discarding air-borne sound waves in favor of bone conduction of the speaker's voice. Aside from technical problems which may have affected the inability of this device to perform adequately, practical considerations also limit the general acceptance of such ear-mounted microphone systems. For example, the Konomi device places a microphone element deep in the ear canal in order for vibrations to be accessed from the bone. This requirement immediately imposes the high cost of having the canal insert portion sized to the unique configuration of the user's ear canal as with a hearing aid. It also adds the discomfort of having an insert in the ear, creating an unnatural and unacceptable sensation which would undoubtedly preclude universal usage of the device.

As a further problem, the Konomi reference may be subject to audio feedback arising from the close proximity of the microphone element and speaker, where a duplex mode is selected. Needless to say, the challenge of an acceptable ear-mounted microphone was not resolved with Konomi.

U.S. Pat. No. 4,930,156 by Norris addressed the problem of audio feedback with its disclosure of an ear microphone/speaker combination; however, the microphone was placed outside the ear and was sensitive to ambient noise. The absence of isolation of the speaker voice gave the device only limited acceptance, despite the fact that it offered some improvement over the prior art.

Some prior art activity, such as U.S. Pat. No. 3,995,124 by Gabr, has developed a line of directional microphones which are generally referred to as unidirectional systems. These microphones typically provide for opposing openings in opposite ends of the microphone casing. This permits sound waves to enter the casing from different orientations with respect to an enclosed speaker element. If the origin of the sound waves is at a substantial distance from the microphone, the arrival of each sound wave at each of the opposing openings is substantially concurrent. Because this sets up two opposing acoustic waves within the speaker casing, the waves cancel and the sound is basically undetected or unregistered at the speaker element.

This technique has been used to reduce ambient noise and provide some speech isolation for phone operators, camera staff, and other isolation communication systems as designated above. Typically, this unidirectional microphone is positioned within a boom or forward extending support arm that places the microphone immediately in front of the speaker's mouth. It's close proximity to the mouth provides a differential response of sound waves at the opposing openings, based on the time difference in arrival of the wave at each opening. As a consequence, the proximate sound waves do not cancel, giving some selectivity to the near speech, as opposed to sound generated at a sufficient distance that the acoustic waves arrive at the respective openings in the speaker casement at the same time.

Nevertheless, there remains a dissatisfaction with the inconvenience of a boom suspended in front of the speaker's face. It imposes an obstacle that interferes with movement of food or drink toward the user's face, as well as providing a limiting factor to movement which might jostle the microphone from its proper position. Cosmetically, it is obviously unpopular. However, because prior art attempts to place the microphone away from the face and toward the ear give rise to feedback problems with the associated speaker positioned at the user's ear, the boom remains the primary means of isolating speech in a microphone system.

What is needed therefore is a microphone that more effectively isolates the voice of the speaker from the environment, yet does not require use of a boom to displace the microphone from the speaker. Neither is there a requirement for insertion of physical structure within the ear canal, with its attendant fitting expense and discomfort.

OBJECTS AND SUMMARY OF THE INVENTION

It is an object of the present invention to provide an ear-mounted microphone which is capable of isolating the voice of the speaker from all extraneous, background noise.

It is a further object of the present invention to provide an ear mounted microphone which does not require entry of any physical structure within the ear canal yet still isolates the voice of the speaker from all outside noises.

Yet another object of the present invention is to provide for an ear mounted microphone which includes a speaker in direct proximity with the microphone for enabling duplex operation in a speak and listen mode.

A still further object of the present invention is to provide a microphone/speaker device which is mounted at the ear and which enables hands free, duplex communication without feedback.

Another object of the present invention is to provide an ear mounted microphone capable of providing audio input to a computer or modem to facilitate voice recognition for direct voice command to compute controls.

Another object of the present invention is to provide a microphone/speaker combination which can be interconnected with a telephone system to provide hands free speak and listen capabilities in duplex mode.

Yet another object of this invention is to enable voice pickup via an ear mounted microphone which can be coupled into a telemetry unit for wireless communication with a modem, computer or other receiver device capable of accepting radio frequency signal.

These an other objects are realized in an ear piece device for use in a communication system which includes a housing having a speaker end and a microphone end, said speaker end being configured for a snug fit at the ear canal of a user without including structure which enters the ear canal during operation. The speaker end and microphone end are separated by an acoustically insulating wall which encloses the microphone end to form a microphone compartment. Acoustical isolation means is coupled between the speaker element and the housing for selectively isolating undesirable frequencies that might interfere with sensitivity of audio pick up at the microphone end of the housing. A microphone element is mounted at the microphone end of the housing in a position such that the microphone element is substantially enclosed within the compartment and is separated from contact with the skull by the housing. This microphone compartment includes means for canceling acoustical waves at the microphone element which enter the compartment from a substantial distance as compared to the near location of the user's skull. Means are provided for coupling signal output from the microphone element to an audio circuit for processing.

The present invention includes a method isolating an individual speech for reproduction from the environment or background noise associated with the individual wherein the method comprises the steps of:

positioning a housing device with contained speaker element and microphone element at an ear canal supported by the user's ear cartilage;

mechanically and acoustically isolating the speaker element from the housing to limit the amount of sound vibration which is carried into the housing;

mechanically and acoustically isolating the microphone element from the housing to limit the amount of sound vibration which is carried into the microphone element; and concurrently channelling vibrations from the housing into a casement for the microphone element such that the vibrations reach the microphone element along the casement at approximately the same time but in opposing phase relationship to result in wave cancellation.

Other objects and features of the present invention will be apparent to those skilled in the art, taken in combination with the accompanying drawings.

DETAILED DESCRIPTION OF THE INVENTION

Figure 1:
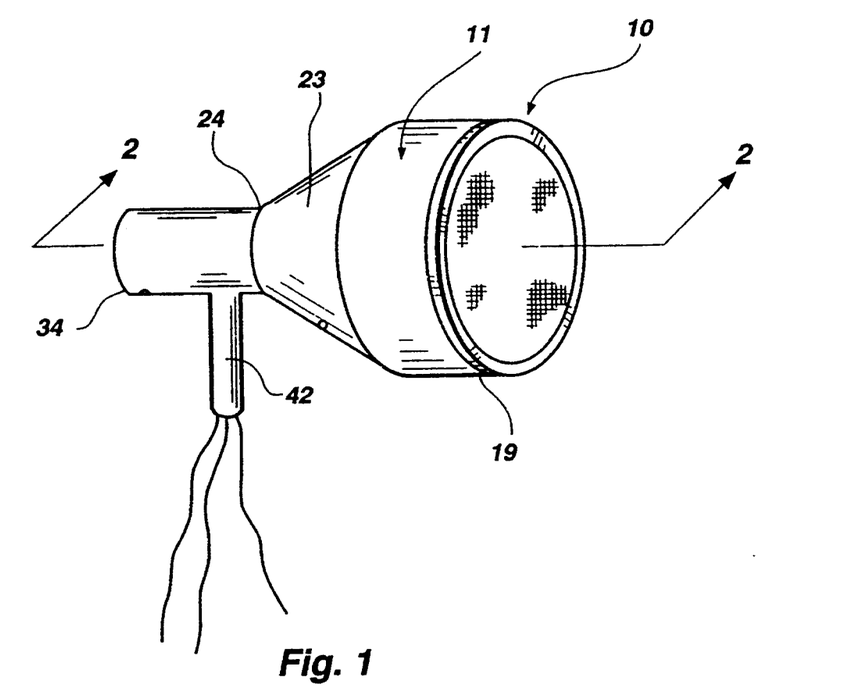
FIG. 1 shows a perspective, elevational view of an ear device including a speaker element and microphone element.

Referring now to the drawings:

The ear piece 10 of the present invention includes a surrounding housing 11 which forms a cavity 12 capable of housing a speaker element 13 with its directional orientation 14 positioned toward the ear canal 15 (FIG. 4) when positioned at the user's ear 16. A microphone element 17 contained within the housing 11 detects primarily sound vibrations generated by the user.

The housing 11 is configured at one end 19 to fit snugly at the ear canal 15 by frictional contact with surrounding ear tissue 20 and 21. It is significant that the housing and its attached structure does not extend into the ear canal 15 and therefore does not impose any discomfort or unique fitting requirements for use of this device. The housing may be constructed of any suitable material such as plastics, and preferably of materials which minimize vibrational transfer between the speaker 13 and microphone 17.

Figure 2:
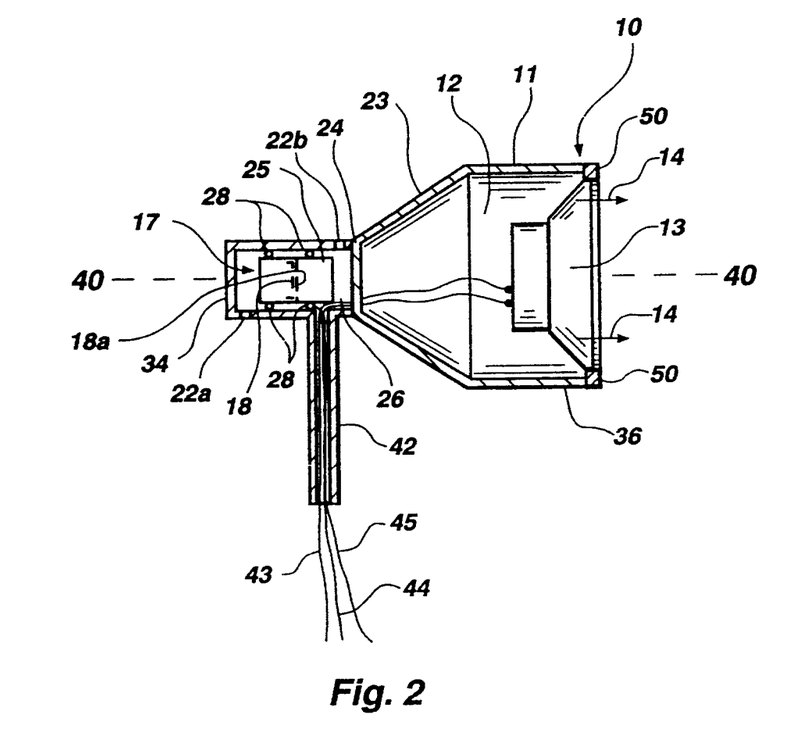
FIG. 2 discloses a cross section across the housing of the device shown in FIG. 1, taken along the lines 2—2.

The microphone 17 may be any conventional type such as a carbon, electret, piezo crystal, etc. The embodiment illustrated in FIG. 2 is an electret microphone having an aluminized mylar diaphragm 18 and plate 18a positioned with a microphone casement 25. This casement 25 is inserted within the microphone end housing 34 with acoustical mounting rings 28 which mechanically and acoustically isolate vibrations from the housing. Those vibrations which pass through the mounting rings are carried into the microphone casing 25 at approximate equal entry distances from the microphone element 18. Because of this approximate equal distance from each mounting ring 28 to the centrally disposed microphone element 18, vibrations from the housing arrive at the microphone element at approximately the same time, but in opposite phase relationship. Accordingly, the opposing vibrational waves cancel, registering no wave energy or vibration. Accordingly, the microphone element is both mechanically and acoustically isolated by reason of the sound insulation and sound cancellation provided by the interconnecting structure at the microphone casing 25. The exact separation distance can be physically tuned by adjusting the mounting rings along the casing until the maximum cancellation effect is achieved.

Background sound vibrations are canceled by use of at least two opposing openings 22a and 22b which communicate through the housing and casing with the surrounding environment. With respect to sound waves travelling from substantial distances, as compared with the distance of the ear piece from the user's mouth, such waves arrive at the respective openings 22a and 22b at the same time. Acoustical waves are concurrently formed at each opening, and propagate toward the microphone element until they cancel. Accordingly, distant sound transmissions are effectively canceled by super positioning of opposing waves entering through the respective opening 22a and 22b. It will be apparent that multiple openings can be applied in place of single opening, with similar sound cancellation.

It will be noted that a second housing portion 42 is provided and operates as a conduit for exiting wire 43, 44 and 45. Wire 43 represents the exterior portion which extends from the microphone element. Wires 44 and 45 are contacts which couple with the speaker element 13.

To enable duplex operation of both speaker and microphone in the same housing, it is necessary to acoustically isolate the speaker element 13 from the casing. In the present invention, this is accomplished by tuning the insulation means 50 similar to operation of a band pass filter within radio circuitry. Specifically, the speaker element 13 is mounted to the end housing 36 through a nonvibrational ring 50 which extends around the speaker element and operates to isolate the housing as sound insulation means from the speaker element. This further helps to prevent sound vibration transmission through the housing and into the microphone element, which might otherwise lead to irritating feedback.

This problem becomes significant in duplex operation because of the close proximity of the speaker element 13 and microphone element 17. In such close proximity, vibration associated with the speaker element would normally be transferred into the housing and immediately fed into the microphone element 17. In a duplex telephone system where side tone is present, signal from the microphone element 17 is fed back into the speaker 13 to facilitate the user hearing his own voice as reproduced. Failure to acoustically isolate the speaker results in vibrational energy transferred into the housing which represents the speaker's voice being recirculated in a loop. This results in the common occurrence referred to as feedback, which becomes most annoying.

This insulating ring 50 is comprised of materials specifically selected or tuned to a particular frequency range that is substantially below the frequencies that will be passed on to the speaker, thereby isolating the speaker acoustically. Placement of the speaker at the front end 36 of the housing provides a large area which enables the use of a large acoustical filter ring 50. Suitable materials which may be applied to tune the insulation ring 50 to a particular frequency range generally include silicon but may be comprised of other materials which can demonstrate an ability to absorb vibrational energy and block its passage from entering the housing 11. Such material can also be applied at the rearward portion 24 of the housing 11 where the respective fine speaker wires 44 and 45 pass through the housing and out the conduit 42. With both the speaker and the attached wiring insulated, the speaker vibrations are isolated and duplex operation is facilitated without feedback.

Figure 3:
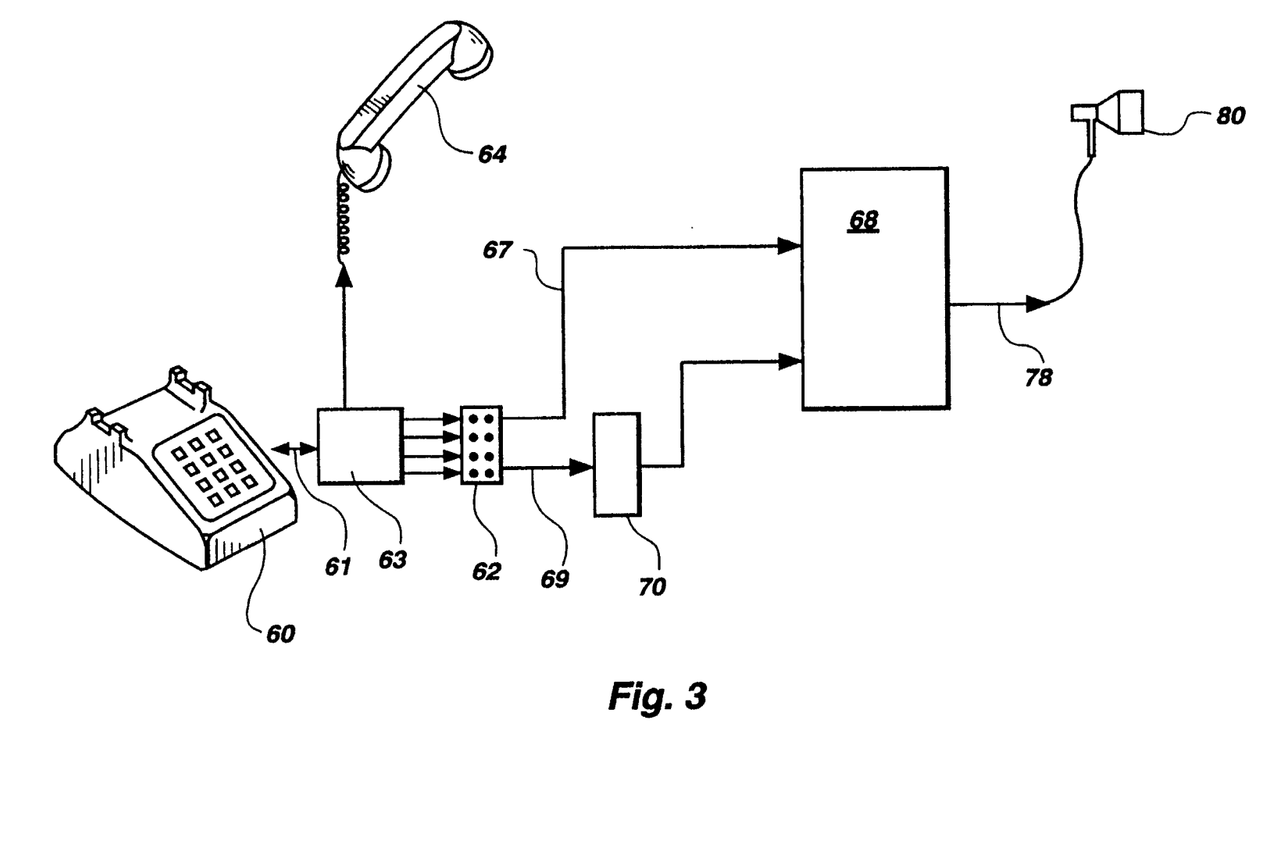
FIG. 3 shows a schematic layout of the ear piece device in combination with a telephone circuit.

FIG. 3 illustrates a basic telephone unit and casement 60 which are coupled into a telephone standard jack for connection to a communication network. The present ear piece device as shown at item 80 provides a microphone and speaker signal which will be processed and transmitted through conventional wirings 61 coupled to the telephone unit 60. Universal coupling configurations to adapt the present system to a standard, four lead telephone wire are disclosed in U.S. Pat. No. 4,930,156 and represented in FIG. 3. Additional explanation of this system may be obtained by reference to this U.S. patent.

Figure 4:
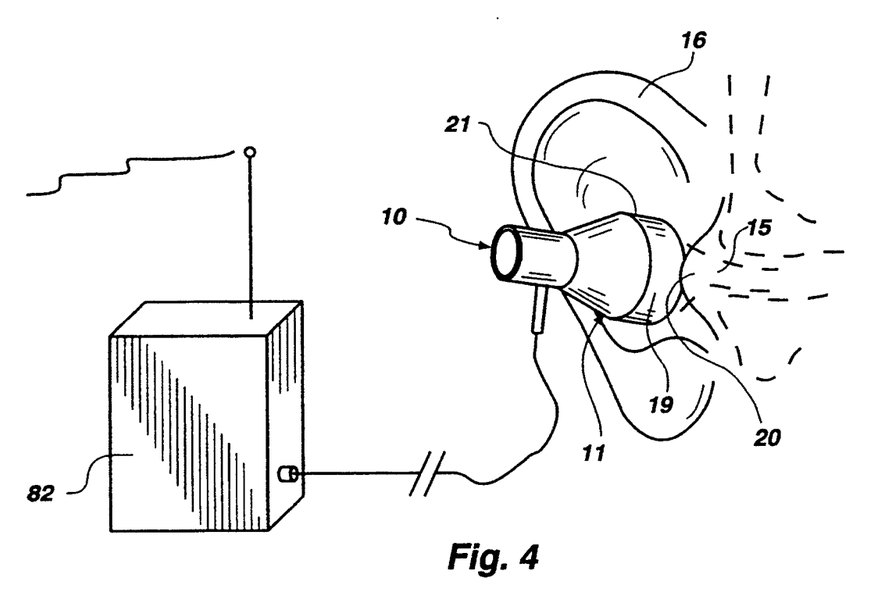
FIG. 4 illustrates the use of the present ear piece device with a telemetry system, enabling isolated voice communication.

The present invention can be coupled into this standard phone system by use of a mode switching device 63. This is accomplished by a toggle switch wherein one position transfers the signal directly to the handset 64 as if the control circuitry and ear piece of the present invention were not attached. When switched to a secondary position, the signal is transferred into an interconnect jack 62 which operates as described in the referenced U.S. patent. One output line 67 carries speaker signal and feeds to the primary control circuitry 68 which includes speaker amplifier, mike preamplifier and phasing control. The second output line 69 carries microphone signals through a diode bridge 70 and into the primary control circuitry 68. Both microphone and speaker signals are transmitted along a four wire connection 78 to the ear mounted speaker/microphone combination 80 as disclosed in this invention and represented in FIGS. 1 and 2. It will also be apparent that the interconnect lead 78 could be serviced by a radio frequency transmitter/receiver which could provide a wireless mode to this duplex telephone system. Similarly, the present system can be wired to a belt transmitter 82 as shown in FIG. 4. In this system, the ear device with either a microphone or microphone/speaker combination can be wired from the ear to the belt transmitter 82 to facilitate convenient operation without the extra weight of a transmitter unit positioned within the housing 11.

The embodiment represented in FIG. 4 is particularly useful with respect to transmission of voice commands to computer systems which are capable of voice recognition. This arises because of the isolated content of the voice reproduction. In a microphone mode, the present device receives sound waves from the user's voice. On the other hand, distant sound waves such are received into the microphone but cancel out as previously explained. Similarly, the rotation of the user's head has no impact upon the quality of voice transmission because relative distance remains the same between the ear and mouth.

In view of this method of isolating the voice of the speaker from the environment, the present ear mounted microphone enables greatly simplified algorithms for implementing voice recognition. In essence, the voice of the speaker is generally the same and can be used to train the algorithm and computer to reproduce corresponding commands associated with the acoustic vibration sent into the housing 11.

When the present invention was substituted within a conventional voice recognition system which previously yielded confidence levels of 45 to 60 percent, voice recognition was improved to the average of 80 to 90 percent. This remarkable improvement based on use of the present microphone element as disclosed and claimed in this application opens the door to a new era of voice command for computer systems generally.

Figure 5:
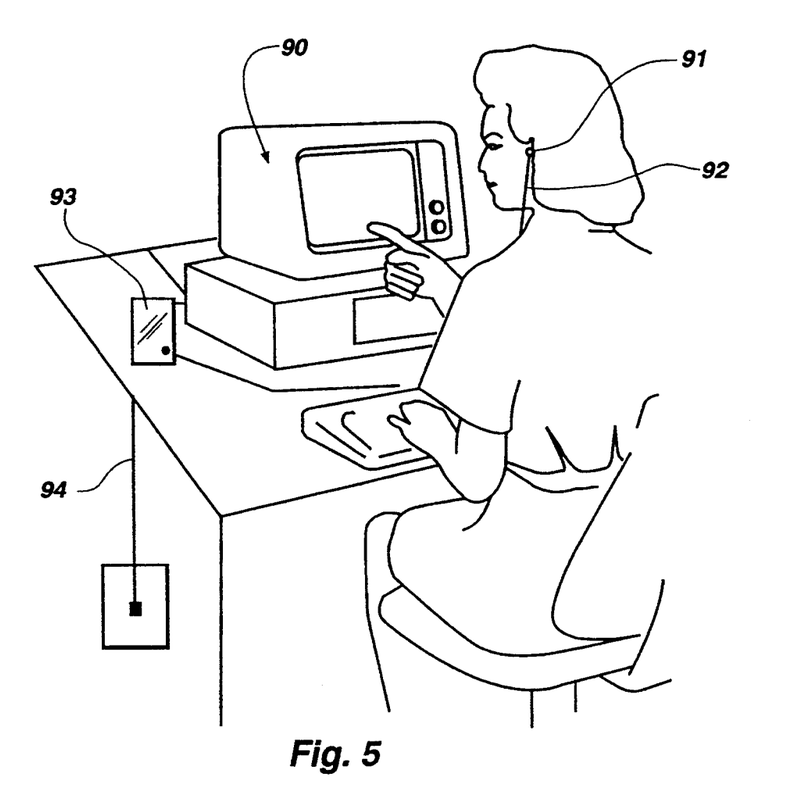
FIG. 5 graphically illustrates the use of the present ear piece device in combination with a computer and modem, enabling voice recognition and voice command.

For example, FIG. 5 illustrates the use of voice command with a computer 90 which includes software capable of voice recognition. Voice commands are supplied through the ear microphone 91 of the present invention, which is wired 92 into a control circuit 93 which amplifies and supplies appropriate signal into a computer modem (not shown) at the back of the computer. Voice command is now enabled and the user may directly state the desired action verbally, to which the computer can immediately respond. Additional voice communication is enabled by the user through a coupled phone line 94 which enables concurrent voice communication with third parties.

Based on this system, the user may discuss in conference call various issues arising with respect to preparation of documents or other matters facilitated by computation of a computer system and may immediately give voice command to the computer to implement and perform desired operations. This is all accomplished in "hands-free mode" without concern for environmental noises associated with the operator's station. The system can even be made mobile for intercommunications while the operator moves about an office building where the office building has been configured with a microcell communication system. In this instance, the telemetry system as shown in FIG. 4 would be used by the operator, who would move from section to section, communicating directly with common frequencies which tie the various microcells into a single network of communication. In this case, the operator can give verbal commands to computer to take care of certain operations, may communicate directly with other individuals within the microcell and can generally perform multiple duties by mere voice command. In addition, the user can direct a computer to place a phone call to a third party outside the microcell and can establish direct phone line communication with this party via the duplex mode within the ear piece 10. Such a system gives total flexibility to the operator who may be mobile and operating with hands free to accomplish multiple tasks and communicate with multiple parties.

These various benefits and improvements are provided in a method for isolating an individual's speech for reproduction from an environment of background noises, generally represented by the following steps:

positioning a housing device with contained speaker element and microphone element at an ear canal supported by the user's ear cartilage;

mechanically and acoustically isolating the speaker element from the housing to limit the amount of sound vibration which is carried into the housing;

mechanically and acoustically isolating the microphone element from the housing to limit the amount of sound vibration which is carried into the microphone element; and concurrently channelling vibrations from the housing into a casement for the microphone element such that the vibrations reach the microphone element along the casement at approximately the same time but in opposing phase relationship to result in wave cancellation.

Figure 6:
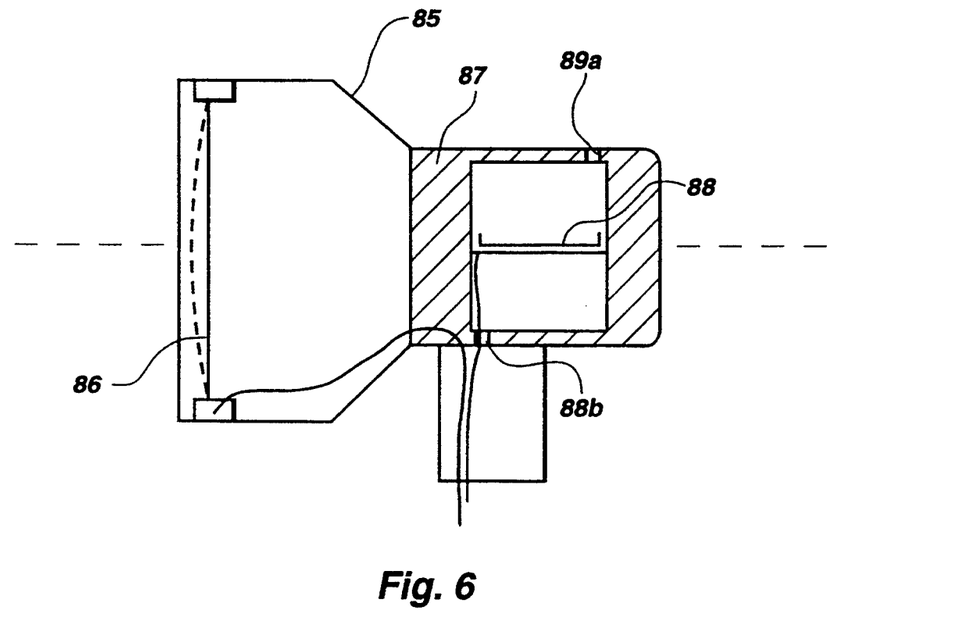
FIG. 6 shows a preferred embodiment of the present invention, comprising a microphone only.

FIGS. 6 discloses an additional embodiment wherein the housing 85 supports a speaker element 86 at its forward end and merges with a microphone casing 87 at its rearward, microphone end. The speaker is a piezo electric crystal of conventional type. In this embodiment, the microphone element 88 is oriented in a vertical direction, with openings 89a and 89b providing sound cancellation for distant sound waves, in accordance with the description previously given. This embodiment offers some advantage in that the distance of travel sound waves is more closely equal to the microphone element, and therefore provides noise cancellation.

Figure 7:
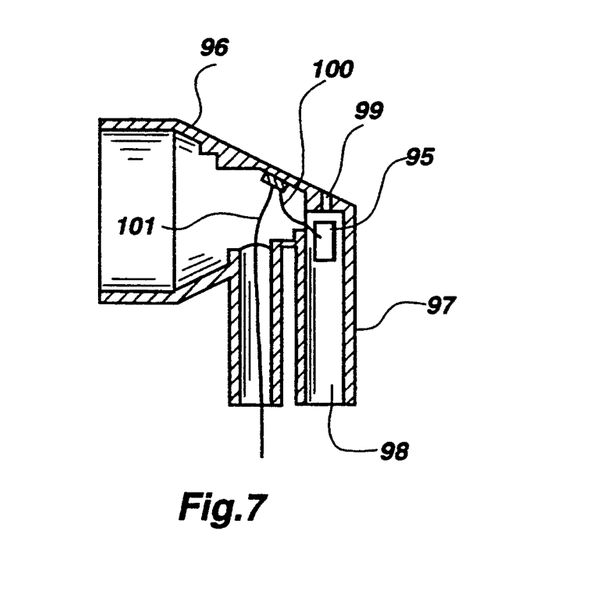
FIG. 7 illustrates an additional embodiment in which the microphone is at right angles with respect to an axis of the housing.

FIG. 7 disclose an embodiment wherein a microphone 95 is provided within the housing 96, but without a speaker element. This housing includes a microphone compartment 97 with a tubular bore 98 which communicates with the surrounding environment. The microphone element 95 is positioned at a proximal end of the bore, near an opening 99 which provides entry of opposing sound waves for interference with similar sound waves coming through the bore opening 98. This configuration provides directional sensitivity by orienting the tubular bore toward the source of sound to be detected. For enhancing directional sensitivity for voice pickup, the tubular bore is oriented downward toward the user's mouth. Electrical contacts 100 and 101 provide a signal path for further processing.

Although preferred embodiments and specific examples have been disclosed, it is to be understood by those skilled in the art that the scope of the invention is to be determined only by the following claims.

I claim:

1. An ear piece device configured for being supported at the ear and providing a microphone element which detects only sounds generated within the immediate vicinity of the skull of a user, said ear piece including:
   a housing having a first end configured to fit snugly at the ear canal of the user, said housing including an interior surface defining a microphone compartment therein;
   a microphone casing disposed within the microphone compartment and having first and second opposing walls, said casing defining a microphone enclosure therein;
   a microphone support member for receiving mechanical vibrations disposed within the casing and having first and second opposing ends coupled to the first and second opposing walls of the casing, respectively, such that said support member spans the microphone enclosure and is substantially enclosed therein;
   a microphone element coupled to the support member such that the microphone element is substantially enclosed within the microphone casing and is separated from contact with the skull by the housing, said microphone element and said support member being collectively interposed between the first and second opposing walls of the casing;
   first and second mounting rings being relatively adjustable with respect to and circumscribing the microphone casing, said rings being positioned between an interior surface of the housing and an exterior surface of the microphone casing to receive mechanical waves from said housing, said rings defining first and second substantially parallel imaginary planes, respectively, said planes pass through the opposing walls of the casings, said rings further being positioned at approximate equal entry distances from and on opposing sides of the microphone element such that the support member and said microphone element reside approximately midway between said parallel planes, said mounting rings thereby enabling cancellation at the microphone element of substantially all mechanical and acoustical waves passing through said rings and into the casing to the microphone element wherein (1) said mechanical waves enter the microphone compartment from the housing and (2) said acoustical waves enter the microphone compartment through air transmission openings from a substantial distance as compared to the relatively near location of the user's skull; and
   means for coupling signal output from the microphone element to an audio circuit for processing.

2. A device as defined in claim 1, wherein the microphone element and compartment are positioned at a second end of the housing from the first end of the housing which is configured to fit snugly at the ear canal.

3. A device as defined in claim 1, wherein the housing includes an elongate axis which is oriented along the portion of the housing which is supported at the ear canal, said axis being directionally oriented toward the ear canal when the housing is in position for use, said microphone element being suspended askew to the elongate axis to provide directional orientation with respect to source of proximal sound vibrations to be detected.

4. A device as defined in claim 3, wherein the microphone compartment includes an elongate tubular bore which is oriented askew with respect to an elongate housing axis, said microphone element being positioned at a more interior portion of the tubular bore toward the elongate housing axis, said tubular bore including an opening communicating to the microphone compartment at an interior end of the tubular bore.

5. A device as defined in claim 1, wherein the housing tapers in configuration from the first end which fits snugly at the ear canal to a tubular body of lesser dimension at the microphone compartment at the second end of the housing, said microphone compartment having at least one forward opening positioned at a forward portion of the compartment and at least one distal opening being positioned at a distal portion of the compartment with respect to the ear canal.

6. A device as defined in claim 1, including (i) a first opening between the surrounding environment and the microphone, the first opening is positioned on an upper side and toward one end of the microphone compartment enabling entry of sound waves therein, and (ii) a second opening between the surrounding environment and the microphone, the second opening is positioned on a lower side and toward an opposite end of the compartment from the first opening, said microphone element being positioned therebetween to provide for cancellation of distant sound waves as they reach the microphone element out of phase.

7. A device as defined in claim 1, further comprising a speaker element positioned at an end of the housing adjacent the ear canal, said microphone element being positioned at the remaining end of the housing.

8. A device as in claim 1, further comprising a sizing ring positioned around the speaker end of the housing for adjusting housing size for snug fit at the ear canal.

9. A device as defined in claim 7, wherein the housing includes an opening oriented toward the ear canal when in position, said opening including the speaker element being positioned thereat for direct exposure to the ear canal to enable the user to receive audio transmissions, said audio transmission and attendant vibration of the speaker element being isolated from the housing by sound insulation means coupled between the speaker element and the housing to prevent pick up of the transmission through the housing and into the microphone element.

10. A device as defined in claim 9, wherein the isolation means comprises a vibration absorbing ring extending around the speaker element and being coupled between the housing and perimeter of the speaker element to prevent transmission of vibration into the housing.

11. A device as defined in claim 10, further including means for isolating from the housing any vibration carried by connecting wires which supply power to the speaker element.

12. A device as defined in claim 7, wherein the microphone compartment comprises a rearward portion of the housing and includes a tubular bore which extends at right angles with respect to the remaining portion of the housing, said tubular bore having a substantially closed interior end and an open distal end, said microphone element being positioned in the interior end of the microphone compartment, said interior end also including a small opening for permitting entry of sound waves from the surrounding environment.

13. A device as defined in claim 1, wherein the respective mounting rings have been empirically positioned along the microphone casing to maximize the degree of noice cancellation at the microphone element.

14. A device as defined in claim 7, further comprising a second housing portion extending at right angles from the housing, said second housing portion comprising a conduit for carrying associated wiring from the microphone and speaker elements to an exterior portion of the device.

15. A device as defined in claim 7, further comprising telephone control circuitry coupled to the speaker element and microphone element, said telephone control circuitry providing access for the speaker element and microphone element as part of a telephone system which provides hands-free use based on both speaking and listening functions being provided through the user's ear.

16. A device as defined in claim 7, further comprising a radio frequency transmitter/receiver unit coupled to the microphone element and speaker element respectively, thereby enabling the use of the ear piece device as part of a wireless system of communication.

17. A device as defined in claim 7, further comprising associated communication and transfer circuitry tuned to a common frequency with a transmitter/receiver unit, thereby enabling use of the ear piece device as part of a microcell communication system, said ear piece device providing direct communication into respective microcell communications satellite receiving and transmitting stations.

18. A device as defined in claim 7, further including connecting means for coupling the microphone element to a modem associated with a computer, said connecting means enabling direct audio transmission into the modem without outside audio signal other than the voice of the user.

19. A device as defined in claim 10, said isolating means comprising a material which selectively limits passage of vibration for frequencies which give rise to feed back between the speaker and microphone elements which are contained within the housing.

20. An ear piece device for use in a communication system, said device comprising:

a housing having a speaker end and a microphone end, said speaker end being configured for a snug fit at the ear canal of a user, said speaker end and microphone end being divided by an acoustically insulating wall which encloses the microphone end to form a microphone compartment;

a microphone casing disposed within the microphone compartment and having first and second opposing walls, said casing defining a microphone enclosure therein;

a speaker element mounted with sound projection oriented toward the user's ear canal and including isolation means coupled between the speaker element and the housing for absorbing undesirable frequencies that interfere with sensitivity of audio pick up at the microphone end of the housing;

a microphone element contained within the microphone casing and having first and second opposing ends coupled to the first and second opposing walls of the casing, respectively, such that the microphone element spans the microphone enclosure and is substantially enclosed therein so as to be separated from contact with the skull by the housing, said microphone element being interposed between said first and second opposing walls of the casing;

first and second mounting rings comprised of acoustical insulation material, said first and second rings being relatively adjustable with respect to and circumscribing the microphone casing, said rings are positioned between an interior surface of the housing and an exterior surface of the microphone casing to receive mechanical vibrations from said housing, said rings defining first and second substantially parallel imaginary planes, respectively, said planes pass through the opposing walls of the casing, said rings further being positioned at approximate equal entry distances from and on opposing sides of the microphone element such that said microphone element resides approximately midway between said parallel planes, said mounting rings thereby enabling cancellation at the microphone element of substantially all mechanical and acoustical vibrations passing through said rings and into the casing to the microphone element wherein (1) said mechanical vibrations enter the microphone compartment from the housing and (2) said acoustical vibrations enter the microphone compartment through air transmission openings from a substantial distance as compared to the relatively nearby location of the user's skull; and means for coupling signal output from the microphone element to an audio circuit for processing.

21. A device as defined in claim 20, wherein the isolation means comprises a vibrational absorbing ring extending around the speaker element and being coupled between the housing and perimeter of the speaker element, said ring being formed of material which is selective as to a range of frequencies which will be decoupled as compared to frequencies which will be transmitted, to prevent transmission of interfering vibration into the housing from the speaker element.

22. A device as defined in claim 21, wherein the isolation means comprises a material which is tuned to acoustically isolate the housing from the speaker element to prevent feedback.

23. A device as in claim 20, further comprising a sizing ring positioned around the speaker end of the housing for adjusting housing size for snug fit at the ear canal.

24. A method for isolating an individual's speech for reproduction from an environment of background noise which is not be detected, said method comprising the steps of:
- a) positioning a housing device containing (i) a speaker element and (ii) a casement having first and second opposing walls and containing a microphone element, at an ear canal supported by a user's ear cartilage;
- b) mechanically and acoustically isolating the speaker element from the housing to limit the amount of sound vibration which is carried into the housing;
- c) coupling a first and second end of the microphone element to the opposing walls, respectively, of the casement such that said microphone element is interposed between said opposing walls and substantially enclosed with said casement;
- d) positioning first and second mounting rings between an interior surface of the housing and an exterior surface of the casement for receiving mechanical vibrations from the housing, and circumscribing the casement with the first and second rings which are relatively adjustable with respect to the casement, such that said rings surround the opposing walls of said casement and define first and second substantially parallel imaginary planes which pass through the opposing walls and the casement at approximate equal entry distances from and on opposing sides of the microphone element, such that the microphone element resides approximately midway between said planes to thereby mechanically and acoustically isolating the microphone element from the housing to limit the amount of sound vibration which is carried into the microphone element; and
- e) concurrently channelling said sound vibration from the housing through the mounting rings and along sound paths having substantially equivalent lengths into opposite sides of the microphone element within the casement such that the sound vibration reaches the microphone element along the opposing sides of the casement at approximately the same time but in opposing phase relationship to result in wave cancellation at the microphone element.

* * * * *